United States Patent [19]
Bascans et al.

[11] Patent Number: 5,414,718
[45] Date of Patent: May 9, 1995

[54] THREE-INPUT POLLER

[75] Inventors: Rémi Bascans, Toulouse; Christophe Fleury, Colomiers; Eric Autechaud, Toulouse; Christian N'guyen, Blagnac, all of France

[73] Assignee: Societe Nationale Industrielle et Aerospatiale, Paris, France

[21] Appl. No.: 919,178

[22] Filed: Jul. 23, 1992

[30] Foreign Application Priority Data

Aug. 2, 1991 [FR] France ............................. 91 09880

[51] Int. Cl.⁶ ............................................. G06F 11/08
[52] U.S. Cl. ........................................ 371/36; 326/35; 326/11
[58] Field of Search ............... 371/36, 67.1, 30; 307/464, 441, 443

[56] References Cited

U.S. PATENT DOCUMENTS

| | | | |
|---|---|---|---|
| 3,555,290 | 1/1971 | Ellermeyer | 307/65 |
| 3,725,818 | 4/1973 | Nurmohamed et al. | 330/124 B |
| 4,264,955 | 4/1981 | Goodwin | 364/510 |
| 4,593,249 | 6/1986 | Aeita et al. | 307/443 |
| 4,617,475 | 10/1986 | Reinschmidt | 307/464 |
| 4,726,026 | 2/1988 | Hilford et al. | 371/25.1 |
| 4,748,594 | 5/1988 | Iida | 307/464 |
| 4,862,297 | 8/1989 | Fukami et al. | 360/53 |

OTHER PUBLICATIONS

ISA Transactions, vol. 29, No. 2, 1 Feb. 1990, pp. 13–16, A. A. Frederickson, "Fault tolerant programmable controllers for safety systems".

*Primary Examiner*—Robert W. Beausoliel, Jr.
*Assistant Examiner*—Albert Decady
*Attorney, Agent, or Firm*—Marshall, O'Toole, Gerstein, Murray & Borun

[57] ABSTRACT

A poller including an output (S), as well as a first (E1), a second (E2), and a third (E3) input, receiving respectively a first ($E_s1$), a second ($E_s2$), and a third ($E_s3$) signal, which are identical during normal operation. The poller further includes a two-channel diverter (AIG1) provided with an active input (A), a quiescent input (R), a control input (EC) and a common output (SC). The quiescent input (R) and the active input (A) of the diverter (AIG1) are respectively connected to the first (E1) and second (E2) inputs of the poller, whereas the common output (S) of the diverter (AIG1) is connected to the output (S) of the poller. A first monitor (M1) with two inputs (X, Y), branched between the second and third inputs (E2, E3) of the poller, is used to measure the deviation between the second ($E_s2$) and third ($E_s3$) signals and to control the diverter (AIG1).

10 Claims, 7 Drawing Sheets

| $E_s1$ | $E_s2$ | $E_s3$ | M1 | M2 | M3 | AIG1 | INT1 | $S_s2$ |
|---|---|---|---|---|---|---|---|---|
| C | C | C | H | H | H | ACT | ACT | $E_s2$ |
| I | C | C | H | B | B | ACT | ACT | $E_s2$ |
| C | I | C | B | H | B | REP | ACT | $E_s1$ |
| C | C | I | B | B | H | REP | ACT | $E_s1$ |
| I | I | C | B | B | B | REP | REP | Z |
| I | C | I | B | B | B | REP | REP | Z |
| C | I | I | B | B | B | REP | REP | Z |
| I | I | I | B | B | B | REP | REP | Z |

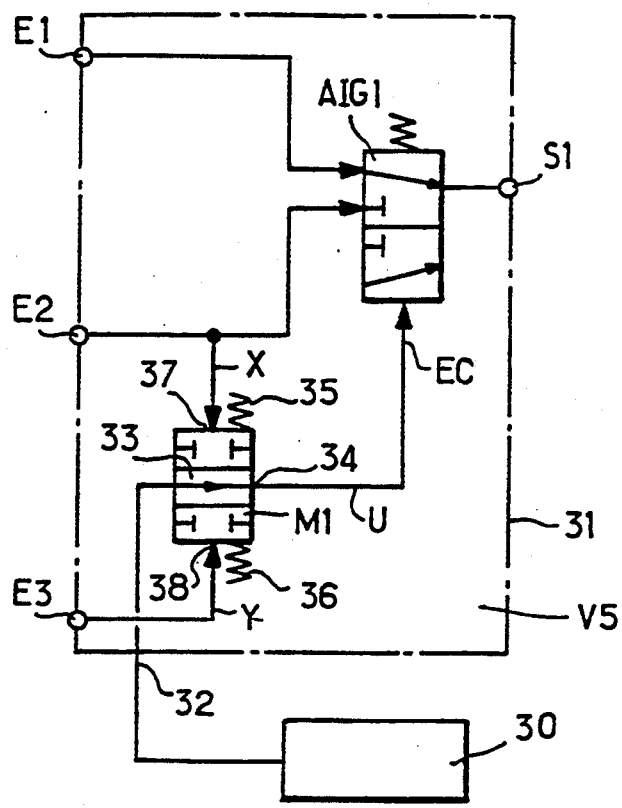
FIG.12
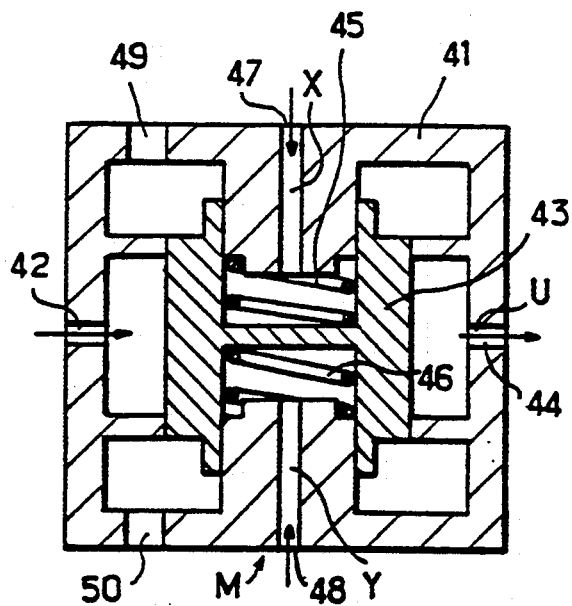
FIG.13
FIG.14

THREE-INPUT POLLER

The present invention relates to a three-input poller.

It is known that pollers are devices, hardware and/or software which, on receiving a plurality (generally at least equal to three) of independent input signals arising from sub-systems used redundantly, which signals are representative of the same quantity, deliver to their output an output signal resulting from a specific poll. For example, in the case of three input signals:

the poll is majority and the output signal is the value of two identical input signals; or the poll relates to the median and the output signal consists of the input signal which is flanked by the other two; or the poll is adaptive, the input signal furthest from the other two being rejected and the output signal being the average of the two remaining input signals; etc.

The role of a three-input poller is to ensure at its output a correct signal from the three input signals, that is to say to tolerate the fault in one of its three input signals, which poses, by its very principle, two problems:

when two input signals are faulty, in neighboring states, the poll favors the two incorrect input signals, since they are majority, and this undesired operation is not seen by the system. The pollers permitting detection of the existence of a second faulty input require an additional mechanism which makes the whole more complex;

the single output represents the critical point of a triplex architecture (system composed of three sub-systems fulfilling the same function so as to provide, to a three-input poller, three signals which are independent but representative of the same quantity), since, when a fault shows up at the output of the poller, service can no longer be rendered or, worse, may be incorrect. In other words, a poller is not tolerant of its own faults, which entails the risk of losing correct service upon a simple fault at poller level.

According to the type of poller implemented, other difficulties may be encountered:

need for strict synchronization of the three input signals relative to one another in order to perform the poll;

problem of processing correct but non-identical input signals, owing to the tolerances of each sub-system formulating said input signals;

problem of rate of detection of improper operation (ratio between detected and undetected faults) on the basis of three signals, which is more complex and less deterministic than for duplex architectures (system composed of two sub-systems fulfilling the same function so as to provide, to an appropriate mechanism, two signals which are independent but representative of the same quantity) where detection of improper operation of the system is a simple comparison of two signals;

problem of some pollers which mask the errors without locating the faulty input, whence the inability to inform the system as regards the identity of the faulty sub-system.

Software pollers make it possible to set in place an evolutive poll, but at the cost of not insignificant computation time, which may be incapable of exploitation in respect of fast systems. In addition, this evolutive poll involves substantial software which requires substantial validation work.

The aim of the present invention is to alleviate these disadvantages. It makes it possible, through the implementation of simple means, to increase both operational reliability and security. It relates, moreover, to all signal types, be the electrical, optical, pneumatic, or other, analog or digital, serial or parallel. It is suitable for conferring upon a system the continuity of a correct service on a single output when one of its three sub-systems is faulty and for isolating the output of the poller when the latter is no longer in a position to ensure correct service.

To this end, according to the invention, the poller comprising an output, as well as a first input, a second input and a third input receiving respectively a first signal, a second signal and a third signal, is notable in that it comprises:

a two-channel diverter provided with an active input, with a quiescent input, and with a control input which is able to receive a control signal which sets, depending on its state, said diverter to an active state or to a quiescent state, and with a common output, said quiescent input and said active input of said diverter being respectively connected to said first and second inputs of said poller, whereas said common output of said diverter is connected to said output of said poller, this common output transmitting the signal applied to the active input when said diverter is in the active state, and transmitting the signal applied to the quiescent input when said diverter is in the quiescent state; and a first monitor with two inputs, connected respectively to said second and third inputs of said poller, which is able to measure the deviation between said second signal and third signal and whose output is connected to the control input of said diverter and is able to control the state of this diverter.

This poller is thus able to detect a fault in said second and/or third input signals and transmit at output another input signal.

The first monitor can have any appropriate structure.

An electrical embodiment, given by way of example for analog or digital, serial or parallel signals, is notable in that said first monitor comprises:

differentiator means for measuring the difference between the signals applied to the inputs of said monitor;

comparator means for comparing said difference with a predetermined threshold and for generating an error signal if the absolute value of said difference is greater than the absolute value of said threshold.

Thus, said monitor delivers an output signal intended to control, in a given state, the associated two-channel diverter, not only when the two signals applied to its inputs are identical, but even when the latter signals are slightly different (owing to a shift in amplitude and/or in phase), said threshold making it possible to tolerate acceptable amplitude differences, whereas too large a difference between the input signals causes an error signal serving to change the state of the diverter so as to suppress transmission of the incorrect signal.

Advantageously, in order to mask the effect of transient defects, delay timer means are interposed in series with the output of the first monitor.

The two-channel diverter may be of the electric switch type or electric switching device consisting of one or more identical switching elements arranged in parallel.

In the case where the input signals are optical, each two-channel diverter can be of the optical multiplexer type with electric control or optical switch with electric control consisting of several identical optical switching elements arranged in parallel.

If the input signals are pneumatic or hydraulic, the two-channel diverter is advantageously of the hydraulic or pneumatic switch consisting of several identical switching elements arranged in parallel. This first monitor can comprise a member subject to the opposing action of the signals appearing in the signal inputs of said first monitor and controlling the passage of fluid between a pressure source and the output of said monitor. In particular, said hydraulic or pneumatic poller can comprise at least one second OR logic gate or one third AND logic gate which are constructed with the aid of at least one piston. It is thus possible to carry out any AND or indeed OR logic function on the hydraulic or pneumatic signals.

Said first monitor can be a secure monitor comprising at least two twinned monitors whose inputs are respectively branched in parallel, and whose outputs are respectively connected to the inputs of a third two-input logic gate, of AND type, whose output is able to provide a signal, one state of which corresponds inherently to the detection of the identity of the two signals applied to the inputs of the monitors when said two twinned monitors each provide at output such an identity detection signal, said output of this third logic gate providing a different state signal in the other cases.

The probability of a fault causing a blocking of the output of the secure monitor in the active state is thus reduced, this increasing security.

Any poller such as described earlier can comprise, additionally:
- an interrupter provided with an active input, with a control input which is able to receive a control signal which sets, depending on its state, said interrupter to an active state or to a quiescent state, and with a common output, said active input and said common output of said interrupter being respectively connected to said common output of said diverter and to the output of said poller;
- a second monitor, with identical function to that of the first monitor, whose two inputs are respectively connected to said first and third inputs of said poller, which is able to measure the deviation between said first and third signals;
- a third monitor, with identical function to that of the first monitor, whose inputs are respectively connected to said first and second inputs of said poller, which is able to measure the deviation between said first signal and second signal; and
- a second three-input logic gate, of OR type, whose output is able to provide a signal, one state of which corresponds inherently to the detection of the identity of the two signals applied to said inputs of a monitor when one at least of said monitors provides at output such an identity detection signal, said output of this second logic gate providing a different state signal in the other case, the inputs of said second OR logic gate being respectively connected to the outputs of said first, second and third monitors, and its output being connected to the control input of said interrupter and being able to control the state of this interrupter.

Thus the poller according to the invention is tolerant to the fault in one of its input signals, the monitors and said second OR logic gate isolating the output of the poller when two input signals are faulty, this improving security.

The principle of operation of the invention is simple and suited to all types of signals; optical, electric or other. However, construction of the poller, in particular the monitors, depends:
- on the type of input signals;
- on the constraints related to the interactions with the environment (asynchronous operation, fault detection mechanism, desired guaranteed response time, etc.).

Depending on the application, there therefore results a number of embodiments of which only a few are described in the present description.

Moreover, the poller according to the invention has the possibility of knowing the identity of the faulty sub-system by analyzing the state of the monitors of the poller, and thus can diagnose its fault so as to act accordingly.

The figures of the attached drawing will give a better understanding of how the invention can be constructed. In these figures, identical references denote similar elements.

FIG. 1 gives the block diagram of the three-input poller according to the present invention.

FIG. 2 is the truth table of said three-input poller of FIG. 1.

FIG. 3 gives the block diagram of an illustrative embodiment of a monitor, used in said poller, with a threshold.

Figure 7:
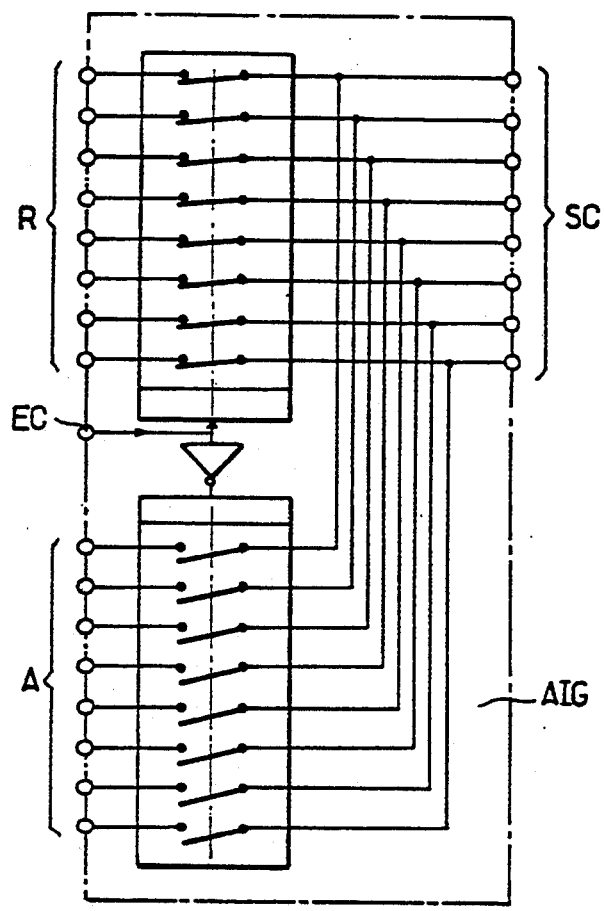

FIG. 7 gives the block diagram of an illustrative embodiment of a switch with several parallel channels.

Figures 8, 9:
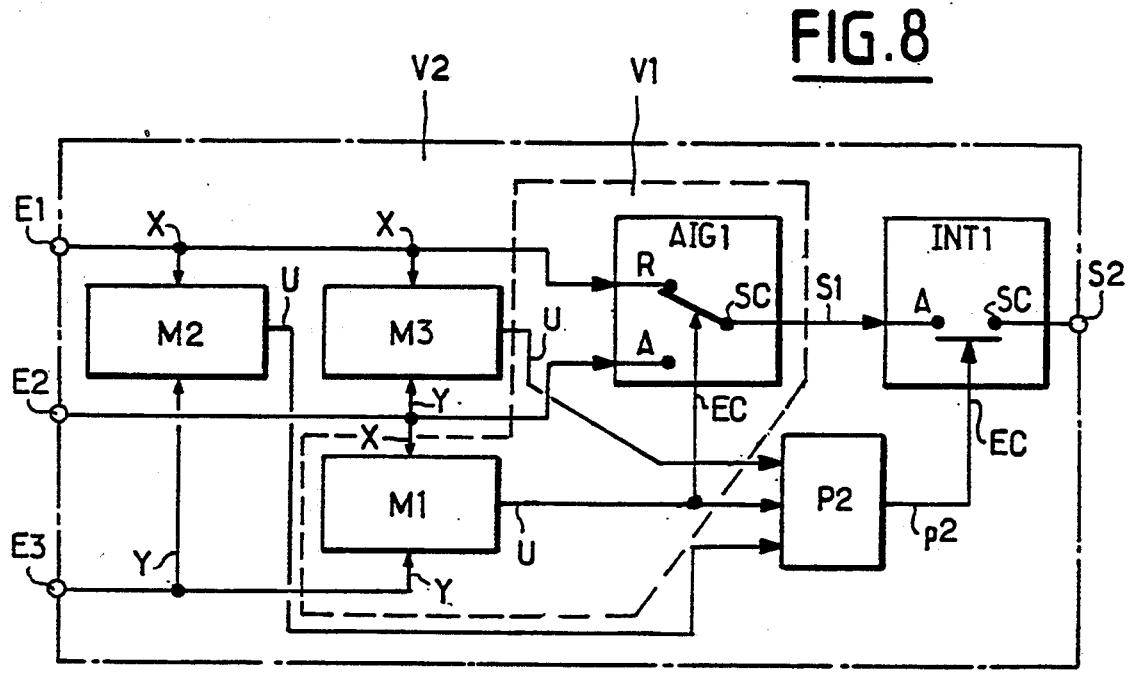

FIG. 8 shows a block diagram of a poller according to the invention, having enhanced security of operation.

FIG. 9 is the truth table of the poller represented in FIG. 8.

Figure 10:
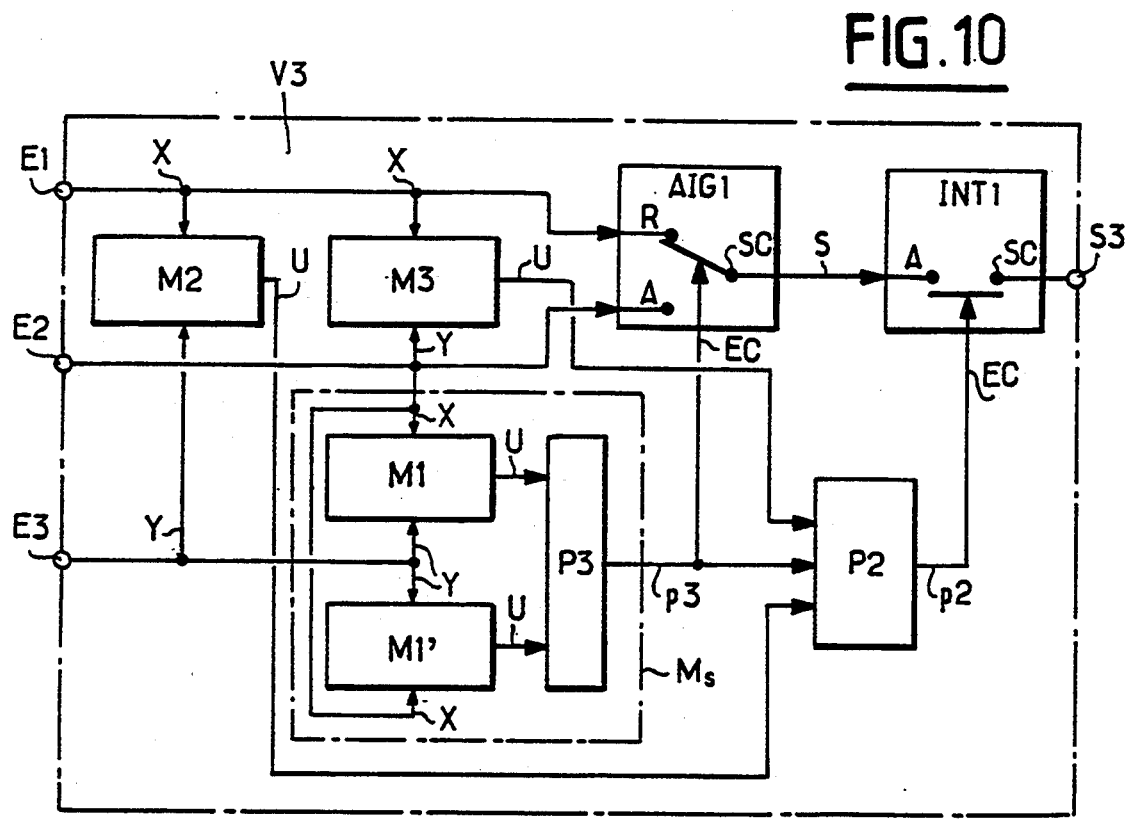

FIG. 10 shows a poller according to the invention, comprising a secure monitor.

Figure 11:
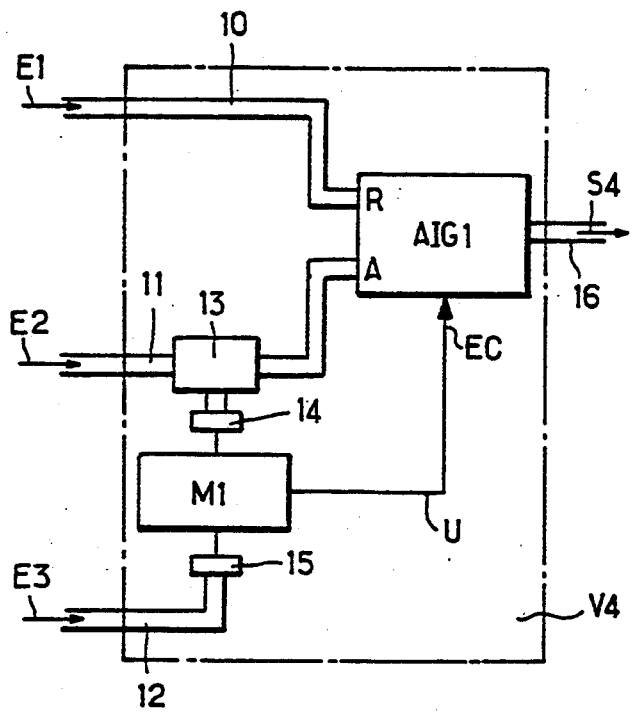

FIG. 11 illustrates the construction of the poller with electro-optical technology.

FIG. 12 illustrates the construction of the poller with hydraulic or pneumatic technology.

Figure 15:
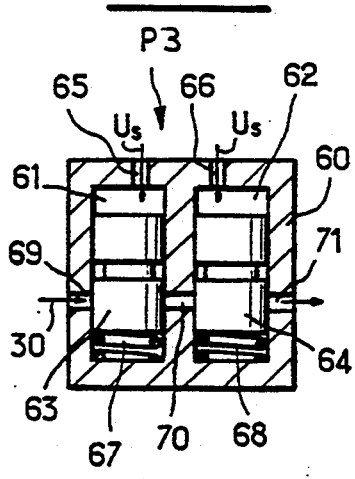
Figure 16:
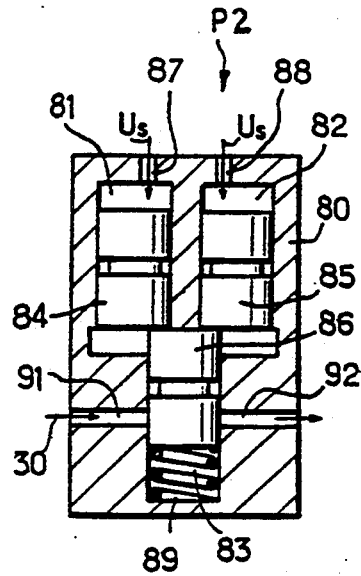

FIGS. 13 and 14 show diagrammatically the pneumatic or hydraulic construction of a monitor and of a two-channel diverter, respectively, according to the invention FIGS. 15 and 16 show diagrammatically and respectively illustrative hydraulic or pneumatic embodiments of an AND gate and of an OR gate.

Figure 17:
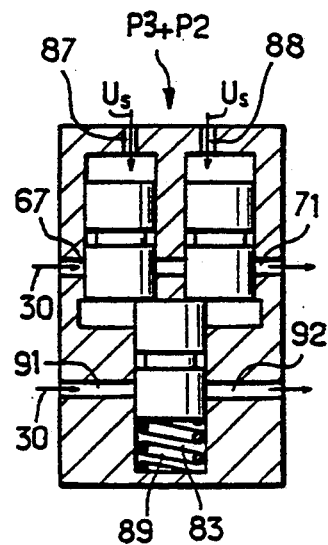

FIG. 17 shows the integrated construction of AND and OR gates as illustrated by FIGS. 15 and 16.

Figures 1, 2:
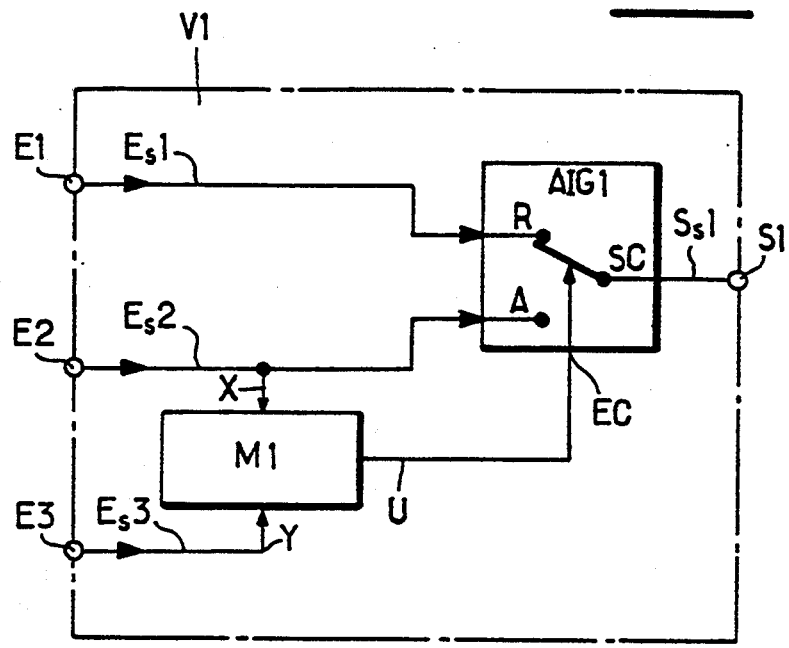

The poller V1 according to the present invention and shown by FIG. 1 is provided with a first input E1, with a second input E2 and with a third input E3, as well as with an output S1. It comprises:
- a two-channel diverter AIG1 provided with an active input A, with a quiescent input R, and with a control input EC, which diverter transmits, to a common output SC, the signal applied to the active input A or to the quiescent input R, according to whether the diverter AIG1 is in the active state ACT or the quiescent state REP respectively, as a function of the signal received on said control input EC. Said quiescent input R and said active input A of said diverter AIG1 are respectively connected to the first input E1 and second input E2 of the poller V1, whereas said common output SC is connected to said output S1; and a first monitor M1 with two inputs X, Y connected respectively to said second input E2 and third input E3 and whose output U is connected to the control input EC of the diverter AIG1 and is able to control the state of said diverter AIG1.

The signal $U_s$ and the output U of the first monitor M1 can take one of two possible states, according to whether this first monitor M1 has or has not detected a discordance between the input signals $X_s$ and $Y_s$ applied to its two inputs X and Y respectively. These two possible states can appear in the form of any quantities, as a function of the construction of this first monitor M1, for example an electric high or low level constance signal, or a digital control value, or even the presence or absence of a pressure or any other quantity. With the aim of clarity, one of these states, at the output U of this first monitor M1, is designated the low state B, and the other state is designated the high state H. As explained above, such a designation does not prejudice the manner in which these states are physically conveyed and in particular the relative magnitude between the two signals conveying these states. The output U is in the low state B when the two signals $X_s$ and $Y_s$ received on said inputs X and Y are different, and is in the high state H when the first monitor M1 receives identical signals $X_s$ and $Y_s$ on its two inputs X and Y. In the present description, signals $X_s$ and $Y_s$ whose deviation is outside an accepted tolerance region are regarded as "different", and signals $X_s$ and Y, whose deviation is within said tolerance region are regarded as "identical". It should be noted that the tolerance region can be null and in this case monitoring is the verification of strict equality.

The first monitor M1 sends the diverter AIG1 to the active state ACT when it provides it with a high state H, and sends it to the quiescent state REP when it provides it with a low state B, on the control input EC.

In the absence of a power source supplying the poller V1, the diverter AIG1 is in the quiescent state REP, irrespective of the state of the signal on its control input EC.

The operation of the poller V1 of FIG. 1 is described below, with regard to the truth table of FIG. 2: the output U of the first monitor M1 is in the low state B when the two signals $X_s$ and $Y_s$ on its inputs X and Y are different, and in the high state H when these two signals are identical. In this truth table, $E_s1$, $E_s2$ and $E_s3$ denote each of the three input signals applied to the inputs E1, E2 and E3 respectively. Similarly, $S_s1$ denotes the output signal appearing at the output S1 of said poller V1. The following configurations may be obtained:

1) The poller V1 is not supplied by a power source. In this case, the diverter AIG1 is in the quiescent state REP, this situation being the one represented in FIG. 1;
2) The three signals $E_s1$, $E_s2$ and $E_s3$ are correct, this being indicated by the letter C in the truth table of FIG. 2. In this case, the first monitor M1 detects the identity of the signals $E_s2$ and $E_s3$ and its output U is in the high state H and controls the diverter AIG1 in the active state ACT. It follows that, on the common output SC of the diverter AIG1, an output signal $S_s1$ appears which is identical to the signal $E_s2$;
3) The signal $E_s1$ is incorrect, this being indicated by the letter I in the table of FIG. 2, whereas the signals $E_s2$ and $E_s3$ are correct. The first monitor M1, noting the identity of the signals $E_s2$ and $E_s3$, is in the high state H at output U and sends the diverter AIG1 to its active state ACT. The signal $S_s1$ is therefore equal to the signal $E_a2$;
4) If now the signals $E_s1$ and $E_s3$ are correct, but the signal $E_s2$ is incorrect, the first monitor M1 notes a difference between the signals $E_s2$ and $E_s3$, its output U is then in the low state B and the diverter AIG1 is in the quiescent state REP; the signal $S_s1$ is then equal to the signal $E_s1$;
5) Similarly, if the signals $E_s1$ and $E_s2$ are correct, but the signal $E_s3$ is incorrect, the output U of the first monitor M1 is in the low state B and the diverter AIG1 is in the quiescent state REP, so that the signal $S_s1$ is equal to the signal $E_s1$;
6) If two of the signals $E_s1$, $E_s2$, $E_s3$ are incorrect and different, just one of them being correct, the outlet U of the first monitor M1 is in the low state B and the diverter AIG1 is in the quiescent state REP, so that the signal $S_s1$ is equal to the signal $E_s1$;
7) Finally, if the three signals $E_s1$, $E_22$, $E_s3$ are incorrect and different, the signal $S_s1$ is equal to the incorrect signal $E_s1$.

Figure 3:
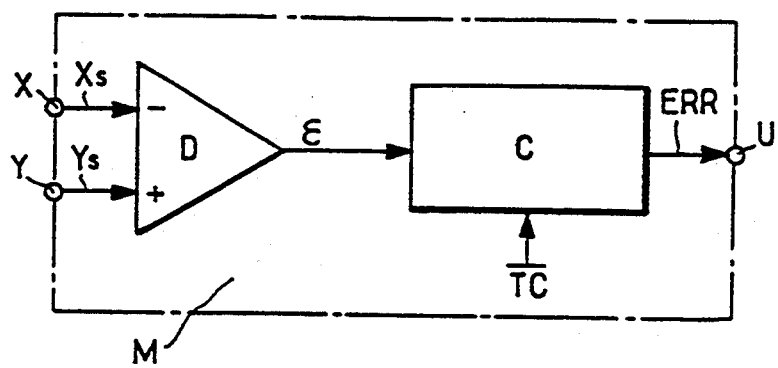

The first monitor M1 can, moreover, include, at output, a threshold comparator. FIG. 3 shows the basic diagram of such a monitor M, able to process analog or digital signals. A differentiator means D receives respectively, on the two inputs X and Y, two signals $X_s$ and $Y_s$ to be compared, and provides, at output, a signal $\epsilon$ proportional to the difference of these two signals. This signal is applied to a first input of a threshold comparator C, receiving, on a second input, a predetermined threshold value (TC), and providing, at output U. a signal ERR indicative of the fact that the signal $\epsilon$ has greater amplitude than the threshold.

The comparison of the signals $X_s$ and $Y_s$ applied to the inputs X and Y of the first monitor M is carried out by analog and/or digital circuits or by software, depending on the desired applications.

Figure 4:
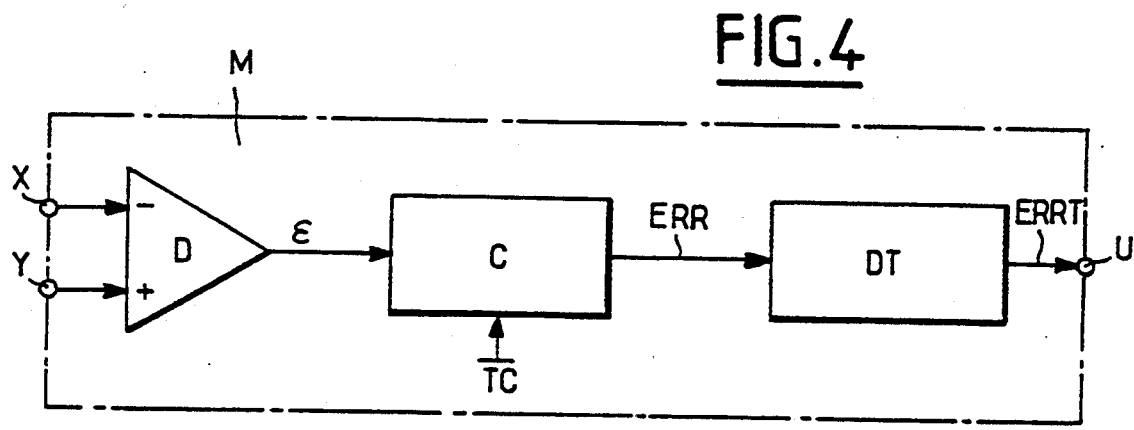
FIG. 4 shows the block diagram of a variant, including a delay timer, of the monitor represented in FIG. 3

The output of the threshold comparator C can, moreover, be connected to the input of a delay timer DT, such as represented in FIG. 4, whose output U provides a delayed error signal ERRT after the output from the comparator C has been at the low level, indicative of a discordance between the input signals $X_s$ and $Y_s$, for at least a predetermined duration $T_s$.

Figure 5:
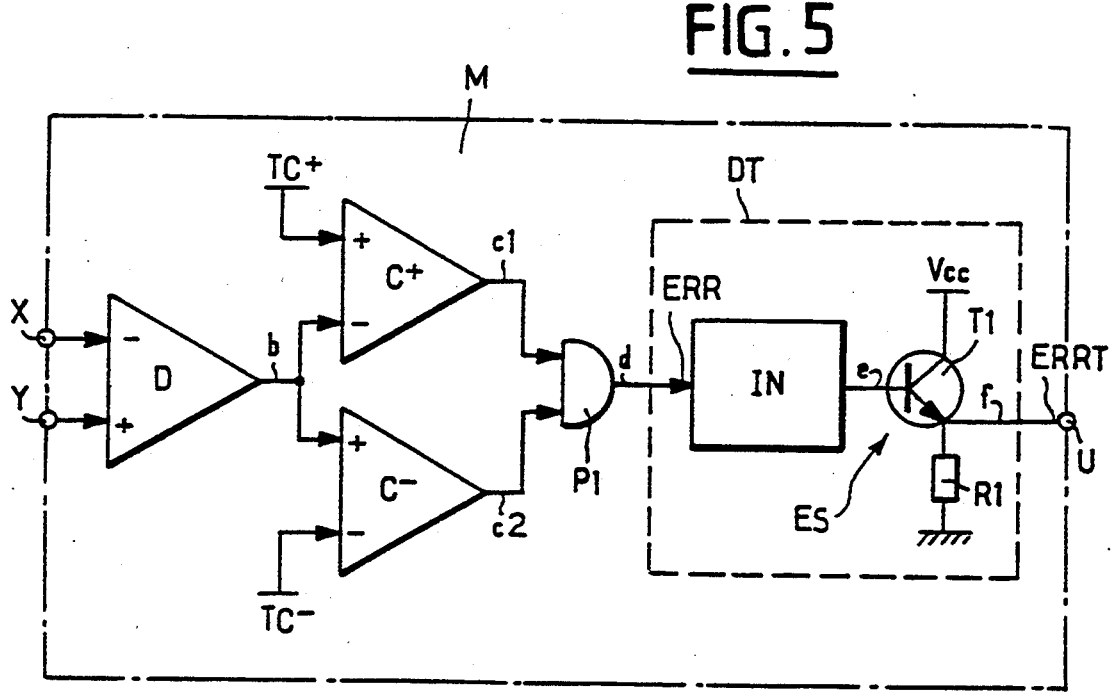
FIG. 5 illustrates an embodiment of said monitor with a delay timer, in electronic form.

As was mentioned above, the poller V can be used for input signals $E_s1$, $E_s2$ and $E_s3$ of various types. FIG. 5 represents an embodiment of the first monitor M1 which is appropriate for analog electrical signals, with a threshold comparator C followed by the delay timer DT.

The monitor M of FIG. 5 comprises:
a differential amplifier D playing the role of differentiator means D and whose inputs are connected respectively to the inputs X and Y of said monitor;
a first comparator C+, whose positive input receives a voltage representative of a positive threshold TC+ and whose negative input is connected to the output of said differential amplifier D;

a second comparator C−, whose positive input is connected to the output of said differential amplifier D and whose negative input receives a voltage representative of a negative threshold TC−;

a first logic gate P1, of AND type, whose two inputs are connected respectively to the outputs of said first and second comparators C+ and C−;

an integrator IN, whose input is connected to the output of the first logic gate P1; and an output stage ES, comprising an interrupter transistor T1 whose base is connected to the output of the integrator IN, the collector to a supply voltage Vcc and the emitter to earth by way of a resistor R1 (the mounting of the transistor T1 represented is given merely by way of illustration of the latter's operation and does not necessarily correspond to the actual mounting employed.)

The output U of the monitor M is connected to the emitter of the transistor T1, in such a way that in the event of the cutting of the supply or the destruction of the transistor T1 in open circuit, the output U of the monitor M is at a voltage close to that of earth, which voltage may correspond to the low state B, and thus an associated diverter AIS is in the quiescent state REP.

The first comparator C+ delivers a signal of constant amplitude (high state) at its output, when the signal which it receives from the differential amplifier D is less than the positive threshold TC+, and, in symmetrical fashion, the second comparator C− delivers a signal of constant amplitude (high state) at its output, when the signal which it receives from the differential amplifier D is greater than the negative threshold TC−, so that these two comparators C+ and C− simultaneously provide a high state at output if the signal arising from the differential amplifier D lies between the positive threshold TC+ and the negative threshold TC−, so that the first logic gate P1 provides at output, in this case only, a high state.

To illustrate the operation of the monitor M of FIG. 5, reference is made below to the graphs of FIGS. 6a to 6f, time t having been plotted on the X-axes.

Figure 6A:
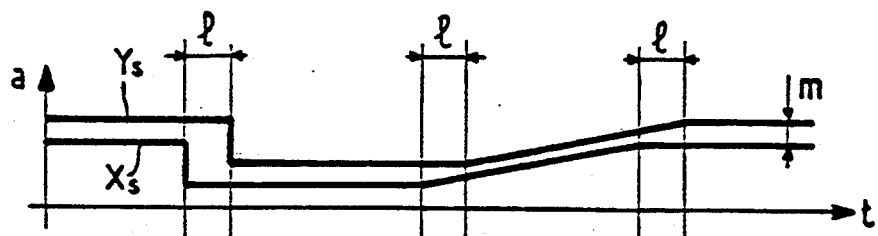
FIGS. 6a to 6f are signal timing diagrams allowing explanation of the operation of the monitor of FIG. 5.
Figure 6B:
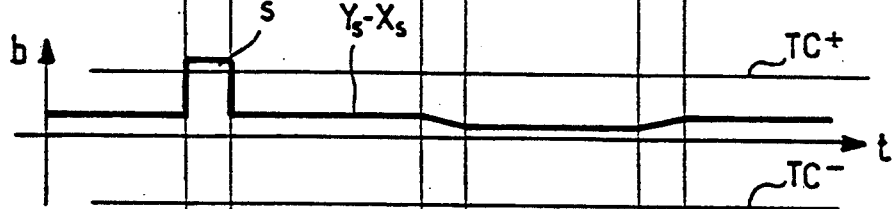
Figure 6C:
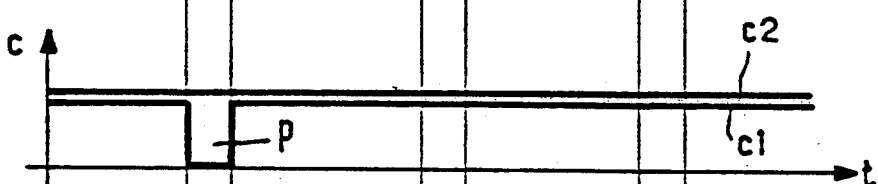
Figure 6D:
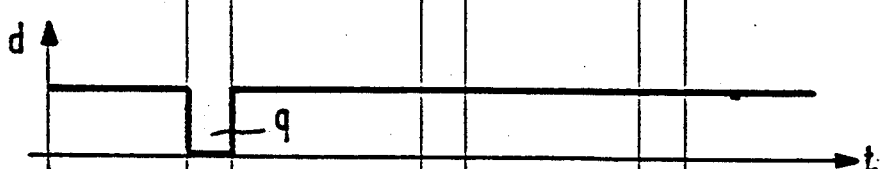
Figure 6E:
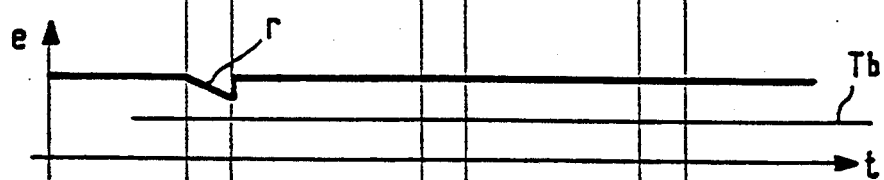

The delay timing diagram of FIG. 6a gives an example of signals $X_s$ and $Y_s$, whose amplitude a is plotted on the Y-axis. It can be seen that the signals $X_s$ and $Y_s$ are similar, but that they are out of phase by 1 and shifted by m in amplitude. The delay timing diagram of FIG. 6b represents the signal $Y_s-X_s$, at the output of the differential amplifier D, the amplitude b of the signal $Y_s-X_s$ being plotted on the Y-axis. It can be seen that, for the major part thereof, the amplitude b of signal $Y_s-X_s$ lies between the thresholds TC+ and TC− of comparators C+ and C−, except as regards the portion s, which exceeds the positive threshold TC+. It results from this that, at their respective outputs, the comparator C+ delivers a signal of constant high amplitude c1, except in respect of the portion s where the high level of the signal c1 is interrupted (at p) and the comparator C− also delivers a signal of constant high amplitude c2 (FIG. 6c). Subsequently, the signal d at the output of the first logic gate P1 is constant and at the high level, except in respect of the interrupt p, where it has an interrupt q (FIG. 6d). At the output of the integrator IN, the signal e is therefore constant and at the high level, except in respect of the interrupt q, where it exhibits a ramp r, corresponding to the slow unloading of said integrator IN. If, as illustrated in FIG. 6e, the signal e and its ramp r are greater than the blocking threshold Tb of the transistor T1, the latter is conducting and the supply voltage Vcc is once again, for the major part, on the output U of the monitor M (see FIG. 6f in which the amplitude f of the signal $U_s$ is plotted on the Y-axis).

Figure 6F:
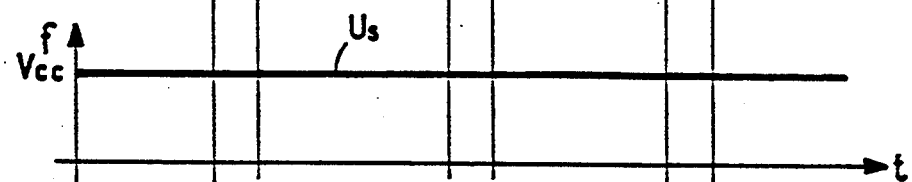

The delay timing diagram of FIG. 6f corresponds to the high state H, taken as being a voltage near Vcc, of the output U of the monitor M.

It will thus be understood that, if the amplitude b of the signal $Y_s-X_s$ leaves the corridor TC+, TC− (see FIG. 6b) for a sufficiently long time, the ramp r of the signal e drops below the blocking threshold Tb of the transistor T1 (FIG. 6e), so that the conduction of the latter is blocked and the signal f becomes zero. The output U of the monitor M is then in its low state B.

The tolerances on the detection parameters (TC+, TC−, $T_s$) must be sufficiently "wide" to preclude untimely disconnections, but must however be sufficiently "narrow" for a signal which is erroneous at output for the duration $T_s$ not to be problematic in respect of the system using said poller V.

As far as the diverter AIG1 is concerned, it can be of the analog or digital signal switch type. It can also include several switches in parallel, controlled identically, making it possible to transmit analog or digital signals. Thus, FIG. 7 represents a parallel diverter AIG with electric control, making it possible to switch signals coded over 8 bits. This diverter AIG can be constructed by using parallel multiplexer logic circuits or relays with quiescent/working position, or optical switches.

The role of the first monitor M1 is to detect whether the signal $E_s2$ or the signal $E_s3$ is incorrect and, in this case, it switches the diverter AIG1 to its quiescent state REP. Therefore, during normal operation (no fault), the signal $E_s2$ is conducted to the output S1. Once the signal $E_s2$ or the signal $E_s3$ is faulty, the diverter AIG1 is again in the quiescent state REP and the signal $E_s1$ is conducted to the output S1.

Moreover, it will be observed that if the first monitor M1 and/or the diverter AIG1 are faulty, electrical continuity is ensured and the output signal $S_s1$ is formed by the signal $E_s1$ or $E_s2$.

Thus, the poller V1 properly ensures its function and thus constitutes a reliable signal selector. It is therefore particularly appropriate for use in the case where the signal $E_s1$ originates from a backup channel which, for example, generates a signal having more restricted performance in terms of accuracy, but which is more reliable than the signals $E_s2$ and $E_s3$.

Subsequently, the poller V1 is used, during normal operation, to transport, while supervising it, the signal $E_s2$ towards the output S1, and, in the case of a difference between the signals $E_s2$ and $E_s3$, to transmit the signal $E_s1$ to the output S1.

However, the poller V1 is not protected against a fault in the reliable signal $E_s1$, when this fault is double and when it exists at the same time as that of one and/or the other of the two signals $E_s2$ and $E_s3$ (see lines 5, 6 and 8 of the truth table of FIG. 2).

Also, to alleviate this disadvantage, the poller V1 can be enhanced as represented in FIG. 8.

The poller V2, according to the present invention and shown by FIG. 8, comprises the poller V1 described above, whose inputs E1, E2, E3 form the three inputs of said poller V2, which, furthermore, is provided with an output S2. In addition to the poller V1, the poller V2 comprises:

an interrupter INT1 provided with an active input A and with a control input EC which is able to place, or not, said active input A in connection with a common output SC, depending on whether this interrupter INT1 is respectively in the active state or in the quiescent state, as a function of the signal applied to said control input EC, said active input A and said common output SC of said interrupter INT1 being respectively connected to said output S1 of said poller V1 and to the output S2 of said poller V2, that is to say this interrupter INT1 can have an active state for which its common output SC is connected to its active input A, and a quiescent state for which its output SC is not connected; it can have the same constitution as a diverter AIG1 which has no quiescent input R;

a second monitor M2, with identical function to that of the first monitor M1, whose two inputs X and Y are respectively connected to the first and third inputs E1 and E3 of said poller V2, which is able to measure the deviation between the first and third signals $E_s1$ and $E_s3$;

a third monitor M3, with identical function to that of the first monitor M1, whose two inputs X and Y are respectively connected to the first and second inputs E1 and E2, which is able to measure the deviation between the first and second signals $E_s1$ and $E_s2$; and a second three-input logic gate P2, of OR type, that is to say any input in the high state H sets a high state H at output, irrespective of the state of the other two inputs, its first, second and third inputs being connected respectively to the outputs U of said monitors M1, M2 and M3 and its output p2 controlling the state of the interrupter INT1 by way of its control input EC.

The operation of the poller V2 of FIG. 8 is described below, with reference to the truth table of FIG. 9, which includes that of FIG. 2. In this truth table, the output signal is denoted by the reference $S_s2$. The various cases which can occur are taken up again below:

1) The poller V2 is not supplied by a power source. In this case, the interrupter INT1 is in the quiescent state REP, so that the output S2 is isolated from the inputs E1, E2, E3, this situation being that represented by FIG. 8;

2) The three signals $E_s1$, $E_s2$ and $E_s3$ are correct. It has been seen that the output signal $S_s1$ from the poller V1 is then equal to the signal $E_s2$. The monitors M1, M2 and M3 note the identity of the signals $E_s1$, $E_s2$ and $E_s3$, their outputs U are in the high state H, and the output p2 of the second logic gate P2 sets the interrupter INT1 to the active state ACT. The output signal $S_s2$ is therefore formed by the signal $E_s2$;

3) The signal $E_s1$ is incorrect, whereas the signals $E_s2$ and $E_s3$ are correct. It has been seen that the signal $S_s1$ is then equal to the signal $E_22$, the outputs U of the monitors M2 and M3 are in the low state B, but the output U from the first monitor M1 is in the high state H. It follows that the first monitor M1, through the second logic gate P2, sets the interrupter INT1 to the active state ACT. The output signal $S_s2$ is therefore formed by the signal $E_s2$;

4) If now the signals $E_s1$ and $E_s3$ are correct, but the signal $E_s2$ is incorrect, it has been seen that the signal $S_s1$ is equal to the signal $E_s1$. The output U from the second monitor M2 is then in the high state H and sets the interrupter INT1 to the active state ACT through the second logic gate P2. The output signal $S_s2$ is then formed by the signal $E_s1$;

5) Similarly, if the signals $E_s1$ and $E_s2$ are correct, but the signal $E_s3$ is incorrect, it has been seen that the signal $S_s1$ is formed by the signal $E_s1$. The output U from the third monitor M3 is then in the high state H and sets the interrupter INT1 to the active state ACT through the second logic gate P2. The signal $S_s2$ is therefore formed by the signal $E_s1$;

6) If two of the signals $E_s1$, $E_s2$, $E_s3$ are incorrect, just one of them being correct, it has been seen that signal $S_s1$ is formed by the signal $E_s1$. However, the outputs U from the three monitors M1, M2, M3 are in the low state B, so that the interrupter INT1 is sent to the quiescent state REP. The output S2 is then isolated from the inputs E1, E2 and E3; in the truth table of FIG. 9, the isolation of the output S2 is symbolized by the letter Z;

7) Finally, if the three signals $E_s1$, $E_s2$, $E_s3$ are incorrect and different, it has been seen that the signal $S_s1$ is formed by the signal $E_s1$; however, here again, the outputs U from the three monitors M1, M2 and M3 are in the low state B, so that the output S2 is isolated from the inputs E1, E2, E3.

It will be observed that, when one of the three signals $E_s1$, $E_s2$ and $E_s3$ is incorrect (lines 2, 3 and 4 of FIG. 9), the state of the output of the monitors M1, M2 and M3 is representative of the identity of the incorrect signal. Indeed:

1) If the outputs U of the monitors M2 and M3 are in the low state B, whereas the output U of the first monitor M1 is in the high state H, it is the signal $E_s1$ (which this first monitor M1 does not receive) which is incorrect;

2) If the outputs U of the monitors M1 and M3 are both in the low state B, whereas the output U of the second monitor M2 is in the high state H, it is the signal $E_s2$ which is incorrect;

3) Finally, if the outputs U of the monitors M1 and M2 are in the low state B, whereas the output U of the third monitor M3 is in the high state H, it is the signal $E_s3$ which is incorrect.

Thus, it is possible, by supervising the state of the monitors M1, M2 and M3, to know the identity of the incorrect input signals $E_s1$, $E_s2$, $E_s3$ and therefore to identify the sub-system which generates it, the monitor which alone has an output in the high state H thus indicating that it is the input signal which it does not receive which is incorrect.

The role of the monitors M1, M2, M3 and of the second logic gate P2 is to isolate the output S2, when two at least of the three input signals $E_s1$, $E_s2$, $E_s3$ are incorrect. Indeed, when at least two input signals are incorrect and different, the three monitors M1, M2 and M3 each detect a discordance and none of them sends the interrupter INT1 to the active state ACT, through the second logic gate P2, the interrupter therefore being in the quiescent state REP. When a single input signal is incorrect, only two monitors detect a discordance and, in this case, the monitor which does not detect any discordance sets the interrupter INT1 to the active state ACT.

The poller V2 is therefore tolerant to a fault in one of the three input signals and it isolates its output once two input signals are faulty in a different state.

Furthermore, it will be observed that, in the event of a simple fault in the first monitor M1 which would block its output U in the high state H, the poller V2 blocks the diverter AIG1 and the interrupter INT1 in the active state ACT, and, therefore, the output S2 of the poller V2 provides the signal $E_s2$, which may be critical if this signal $E_s2$ is incorrect. To alleviate this disadvantage, it can be advantageous to provide, as represented in FIG. 10, a fourth monitor M1' whose inputs are branched in parallel with those of the first monitor M1.

The poller V3 of this FIG. 10 comprises the poller V2 of FIG. 8 and it comprises, additionally:

the fourth monitor M1' with identical function to that of the monitors M1, M2 and M3, whose two inputs X, Y are respectively connected to the inputs E2 and E3, hence in parallel with those of the first monitor M1; and a third two-input logic gate P3, of AND type, that is to say the output of this third AND logic gate, P3, is only in the high state H if the two inputs are simultaneously in the high state H, one input of which is connected to the output U of said fourth monitor M1'.

Furthermore, the output U of the first monitor M1, instead of being connected to the first input of the second gate P2 and to the diverter AIG1, as is the case in the poller. V2 of FIG. 8, is connected to the other input of the third logic gate P3. Moreover, the output p3 of this third gate P3 is, on the one hand, connected to the first input of the second logic gate P2 and, on the other hand, is connected to the control input EC of the interrupter INT1.

Thus, the signal on the output p3 of the third logic gate P3 only sends the diverter AIG1 and the interrupter INT1 to the active state when the two monitors M1 and M1' are simultaneously uncorrupted and detect the identity of the signals $E_s2$ and $E_s3$. There is therefore no risk of the first, faulty, monitor M1, whose output is kept in the high state H, being able to transmit to the output S3 a signal $E_s2$ which is itself incorrect.

The assembly consisting of the two twinned monitors M1 and M1' and the third logic gate P3 constitutes a secure monitor Ms having the same function as a monitor as described earlier, but whose output p3 runs far less risk of remaining blocked in the state activating the diverter AIG1, in the event of a hardware fault. The duplication of the monitor M1 can extend to more than one other monitor M'1, by adding inputs to the third logic gate P3.

Such a secure monitor Ms can be used as such in any setup requiring one or more high-security monitors.

The embodiments of the poller, shown by FIGS. 1, 8 and 10 have been described, with the aid of FIGS. 4 and 6a to 6f, as being of electrical nature, the second and third logic gates P2 and P3 being of known type. They can be constructed by means of integrated circuits or from diode setups.

FIG. 11 shows an embodiment of such a poller V1 in electro-optical form V4. In this case, the two-channel diverter AIG1 is an optical multiplexer with electric control, whereas the first monitor M1 is of electrical type, as described earlier.

The optical inputs E1 and E2 are respectively connected to the quiescent R and active A inputs of the optical diverter AIG1 by optical fibers 10 and 11, whereas the optical inputs E2 and E3 are respectively connected to the inputs X and Y of the first monitor M1 by the optical fiber 11 and an optical fiber 12.

In the optical fiber 11 there is provided an optical coupler 13 in a "Y" whose diverted branch controls a photoelectric cell 14 constituting the input X of the first monitor M1, whereas its input Y is constituted by a photoelectric cell 15 receiving the optical fiber 12.

The output S4 of this poller V4 is formed by an optical fiber 16 connected to the output SC of the diverter AIG1. The output U of the first monitor M1 is connected to the control input EC of the diverter AIG1 and controls the state of this diverter AIG1.

It is possible to construct such an electro-optical poller V4 comprising several fibers in parallel, by duplicating the optical fibers, the couplers and electro-optical interfaces and by using optical diverters and capable of switching several fibers, for example quiescent/working electro-optical relays with several fibers at output, as diagrammatically shown in FIG. 7, or a combination of several such relays with a single output fiber.

Such a poller V4 can clearly comprise the various add-ons of threshold and delay timing set out earlier.

It is readily noted that the operation of this electro-optical poller V4 is identical to that of the poller V1 described earlier.

FIG. 12 represents an embodiment of such a poller V1 in hydraulic (or again pneumatic) form V5 comprising a pressurized fluid source 30 applied to a package 31 comprising a supply input 32.

It is easily understood that the first monitor M1, for a hydraulic construction, can consist, diagrammatically, of a slide valve 33 making the supply input 32 and the output U 34 of this first monitor M1 intercommunicate only when the slide valve is in the central position. This slide valve 33 is kept in this central position by virtue of two opposing springs 35 and 36 controlled by the two monitored signals $X_s$ and $Y_s$ which are applied to the inputs X and Y, labeled 37 and 38 respectively, this as long as the monitored signals $E_s2$ and $E_s3$ are correct, and is thrust from one side or the other, interrupting the communication between the supply input 32 and the output U 34 of the first monitor M1, once a difference shows up between the two signals $E_s2$ and $E_s3$ monitored by this first monitor M1.

FIG. 13 presents diagrammatically an illustrative embodiment of a pneumatic monitor M1, formed by a distributer M, consisting of a package 41, of an input supply orifice 42 and comprising a movable piston 43 moving in this package 41 and controlling the pressurizing of an output orifice 44, which piston is subject to the opposing action of two springs 45 and 46, as in the case of the earlier hydraulic monitor M1, and controlled by the two monitored signals $X_s$ and $Y_s$ applied to the inputs X and Y, labeled 47 and 48 respectively. Depending on the respective values of the pressures of the signals $X_s$ and $Y_s$, the piston 43 sets in communication with one another the input supply orifice 42 of the package 41 receiving the pressure of the source 30 and the output orifice 44 of said package 31 constituting the output U of the monitor M, or else sets this output U 44 in communication with the atmosphere through the orifices 49 or 50.

Just as for an electronic embodiment, it is possible to create a threshold in the action of the monitor M, by having springs 45 and 46 which are not strongly compressed in the equilibrium state of the monitor M, this requiring the provision of work to compress one of the springs 45 or 46, the other spring not compensating for the compressive effort through its own expansion.

Similarly, the action of the monitor M can be delayed by use, for example, of orifices of small diameter, only allowing a small throughput of fluid to pass.

Moreover, the two-channel diverter AIG1 consists of a distributor DIS represented in FIG. 14 formed of a package 51 comprising a control input orifice EC, labeled 52, and a movable piston 53 able to move in this package 51, under the action of the pressure transmitted by said control input EC 52 to which is opposed that of a spring 55. Depending on the value of the pressure of the signal applied to said control input EC, the piston 53 sets one or other of two signal input orifices 57 and 58 of the package 51 in communication with the output orifice 54, said signal input orifices 57 and 58 corresponding to the quiescent R and active A inputs respectively.

The hydraulic or pneumatic diverter AIG described above can be rendered able to switch several signals in parallel, by duplicating the elements required for each signal.

Here again, it is easily noted that the operation of the poller V5 of FIG. 12 is similar to that of the poller V1 described earlier.

The interrupter INT1, described earlier, can be constructed, in each technology set out, in the same way as the corresponding diverter AIG1, without quiescent input R.

FIGS. 15 and 16 represent illustrative hydraulic or pneumatic embodiments of said third AND logic gate, P3, and second OR logic gate, P2.

The third AND logic gate, P3, represented in FIG. 15, includes a package 60, separated internally into two chambers 61 and 62, in each of which is housed a piston 63 or 64 containing a throat. These chambers 61 and 62 each include a control orifice, 65, 66 respectively, each connected respectively to the output U of one of the monitors M1 and M1', in such a way that said pistons 63 and 64 experience the action of the signals $U_s$ arising from the corresponding outputs U and to which is opposed the action of two springs, 67 and 68 respectively. Furthermore, the package 60 includes, in the chamber 61, an orifice 69 connected to the source 30, an intermediate orifice 70, connecting the chambers 61 and 62, and an output orifice 71 into the chamber 62. The orifice 71 constitutes the output of the third AND logic gate, P3, and a pressure signal appears there only when the two pistons 63 and 64, thrust back by the pressure due to the signals $U_s$ arising from the outputs U, arriving via the control orifices 65 and 66, place the orifices 69 and 71 in communication through said pistons 63 and 64 and the intermediate orifice 70.

The second OR logic gate, P2, represented in FIG. 16, includes, for the purposes of simplifying the drawing, only two inputs, and not three as is shown by FIG. 4. It is however clear that, by the same principle, it is possible to construct a second logic gate P2 with three inputs. This second OR logic gate, P2, includes a package 80, separated internally into three chambers 81, 82 and 83, in each of which is housed a piston 84, 85, 86, furnished with a throat. The chambers 81 and 82 include a control orifice 87 and 88 respectively, connected respectively to the output U of two monitors, in such a way that the pistons 84 and 85 experience the action of the corresponding signals U. These pistons 84 and 85 are in contact with one end of the piston 86, whereas a spring 89 is in contact with the other end of the piston 86 and opposes the action of the pistons 84 and 85.

Furthermore, the package 80 includes orifices 91 and 92 which are able to be placed in communication with one another, through the piston 86, the orifice 91 being connected to the source 30. The orifice 92 constitutes the output of the second OR logic gate, P2, and a pressure signal appears there only when one of the two pistons 84 or 85, thrust back by the pressure due to the signals $U_s$ arriving via the control orifices 87 and 88, leads the piston 86 to place the orifices 91 and 92 in communication.

FIG. 17 represents a logic device providing both the function of the second OR logic gate, P2, and that of the third AND logic gate, P3, of FIGS. 15 and 16 respectively.

We claim:
1. A poller (V) comprising an output (S), as well as a first input (E1), a second input (E2) and a third input (E3) receiving respectively a first signal ($E_s1$), a second signal ($E_s2$) and a third signal ($E_s3$), which comprises:
   only one two-channel diverter (AIG1) provided with an active input (A), with a quiescent input (R), and with a control input (EC) which is able to receive a control signal which sets, depending on its state, said diverter (AIG1) to an active state (ACT) or to a quiescent state (REP), and with a common output (SC), said quiescent input (R) and said active input (A) of said diverter (AIG1) being respectively connected to said first and second inputs (E1, E2) of said poller (V), whereas said common output (SC) of said diverter (AIG1) is connected to said output (S) of said poller (V), this common output (SC) transmitting the signal applied to the active input (A) when said diverter (AIG1) is in the active state (ACT), and transmitting the signal applied to the quiescent input (R) when said diverter (AIG1) is in the quiescent state (REP); and
   a first monitor (M1) with two inputs (X, Y), connected respectively to said second and third inputs (E2, E3) of said poller (V), which is able to measure the deviation between said second signal ($E_s2$) and third signal ($E_s3$) and whose output (U) is connected to the control input (EC) of said diverter (AIG1) and is able to control the state of this diverter (AIG1).

2. The poller (V) as claimed in claim 1, in which said first monitor (M1) is of the type able to process analog or digital, serial or parallel signals, wherein said first monitor (M1) comprises:
   differentiator means (D) for measuring the difference between the signals applied to the inputs (X, Y) of said first monitor (M1);
   comparator means (C) for comparing said difference with a predetermined threshold (TC+, TC−) and for generating an error signal if the absolute value of said difference is greater than the absolute value of said threshold (TC+, TC−).

3. The poller (V) as claimed in claim 1 wherein delay timer means (DT) are interposed in series with the output (U) of the first monitor (M1).

4. The poller (V) as claimed in claim 1, wherein the two-channel diverter (AIG1) is of the electric switch type or electric switching device consisting of one or more identical switching elements arranged in parallel.

5. The poller (V) as claimed in claim 1, wherein the two-channel diverter (AIG1) is of the optical multiplexer type with electric control or optical switch with electric control consisting of several identical optical switching elements arranged in parallel.

6. The poller (V) as claimed in claim 1, wherein the two-channel diverter (AIG1) is of the hydraulic or pneumatic switch type or hydraulic or pneumatic switch consisting of several identical switching elements arranged in parallel.

7. The poller (V) as claimed in claim 6, wherein said first monitor (M1) is able to process fluid pressure signals, wherein the said first monitor (M1) comprises a member (43) subject to the opposing action of the signals appearing in the signal inputs (X, Y) of said first monitor (M1) and controlling the passage of fluid between a pressure source (30) and the output (U) of said first monitor (M1).

8. The poller as claimed in claim 6, which comprises at least one second OR logic gate (P2) or one third AND logic gate (P3) constructed with the aid of at least one piston.

9. A poller (V3) as claimed in claim 1, wherein said first monitor (M1) is a secure monitor (Ms) comprising at least two twinned monitors (M1, M1') whose inputs (X, Y) are respectively branched in parallel, and whose outputs (U) are respectively connected to the inputs of a third two-input logic gate (P3), one AND type, whose output (p3) is able to provide a signal, one state of which corresponds inherently to the detection of the identity of the two signals applied to said inputs (X, Y) of the monitors when said two twinned monitors (M1, M1') each provide at output (U) such an identity detection signal, said output (p3) of this third gate (P3) providing a different state signal in the other cases.

10. Poller (V2) as claimed in claim 1, which comprises, additionally:

an interrupter (INT1) provided with an active input (A), with a control input (EC) which is able to receive a control signal which sets, depending on its state, said interrupter (INT1) to an active state (ACT) or to a quiescent state (REP), and with a common output (SC), said active input (A) and said common output (SC) of said interrupter (INT1) being respectively connected to said common output (SC) of said diverter (AIG1) and to the output (S2) of said poller (V2);

a second monitor (M2), with identical function to that of the first monitor (M1), whose two inputs (X, Y) are respectively connected to said first and third inputs (E1, E3) of said poller (V2), which is able to measure the deviation between said first signal ($E_s1$) and third signal ($E_s3$);

a third monitor (M3), with identical function to that of the first monitor (M1), whose inputs (X, Y) are respectively connected to said first and second inputs (E1, E2) of said poller (V2), which is able to measure the deviation between said first signal ($E_s1$) and second signal ($E_s2$); and a second three-input logic gate (P2), of OR type, whose output (p2) is able to provide a signal, one state of which corresponds inherently to the detection of the identity of the two signals applied to said inputs (X, Y) of a monitor when one at least of said monitors (M1, M2, M3) provides at output (U) such an identity detection signal, said output (p2) of this second logic gate (P2) providing a different state signal in the other case, the inputs of said second OR logic gate (P2) being respectively connected to the outputs (U) of said first (M1), second (M2) and third (M3) monitors, and its output (p2) being connected to the control input (EC) of said interrupter (INT1) and being able to control the state of this interrupter (INT1).

* * * * *

UNITED STATES PATENT AND TRADEMARK OFFICE
CERTIFICATE OF CORRECTION

PATENT NO. : 5,414,718
DATED : May 9, 1995
INVENTOR(S) : Bascans, et al.

It is certified that error appears in the above-identified patent and that said Letters Patent is hereby corrected as shown below:

On the face of the patent, after "Assignee," "Societe Nationale Industrielle et Aerospatiale" should be --Aerospatiale Societe Nationale Industrielle--

Col. 6, line 13 "$E_*2$" should be --$E_*2$.--

Col. 9, line 58 "$E_2 2$" should be --$E_*2$.--

Signed and Sealed this

Twelfth Day of September, 1995

Attest:

BRUCE LEHMAN

Attesting Officer          Commissioner of Patents and Trademarks